US012770403B2

(12) United States Patent
Viswanath

(10) Patent No.: US 12,770,403 B2
(45) Date of Patent: Oct. 20, 2026

(54) COMPUTER VISION BASED REAL TIME SAFETY AND COMPLIANCE SYSTEM FOR VEHICLE ACCESS CONTROL

(71) Applicant: SAUDI ARABIAN OIL COMPANY, Dhahran (SA)

(72) Inventor: Channa Venkata Viswanath, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 19/041,334

(22) Filed: Jan. 30, 2025

(65) Prior Publication Data

US 2026/0220945 A1 Jul. 30, 2026

(51) Int. Cl.

*G06V 20/54* (2022.01)
*G06V 20/62* (2022.01)
*G07C 9/30* (2020.01)

(52) U.S. Cl.

CPC ............ *G06V 20/54* (2022.01); *G06V 20/625* (2022.01); *G07C 9/30* (2020.01); *G06V 2201/07* (2022.01)

(58) Field of Classification Search

CPC ................. G06V 20/54; G06V 20/625; G06V 2201/07; G07C 9/30

(Continued)

(56) References Cited

U.S. PATENT DOCUMENTS 5,726,705 A * 3/1998 Imanishi ............ G01N 21/8806 356/600
5,844,801 A * 12/1998 Kodama .............. B62D 65/005 700/110

(Continued)

FOREIGN PATENT DOCUMENTS

| | | | |
|---|---|---|---|
| CN | 107085723 | A | 8/2017 |
| CN | 109657590 | A | 4/2019 |
| CN | 116453071 | A | 7/2023 |
| CN | 117745720 | B | 5/2024 |
| CN | 114694412 | B | 8/2024 |
| WO | 2007/032025 | A2 | 3/2007 |
| WO | 2022/241807 | A1 | 11/2022 |

OTHER PUBLICATIONS

Luckow, Andre et al., "Artificial Intelligence and Deep Learning Applications for Automotive Manufacturing"; 2018 IEEE International Conference on Big Data (Big Data); pp. 3144-3152; 2018 (9 pages).

*Primary Examiner* — Tung T Vo

(74) *Attorney, Agent, or Firm* — Osha Bergman Watanabe & Burton LLP

(57) ABSTRACT

A system includes an access gateway, sensors, a server, data connections, a computing device, and a display. The access gateway actuates to permit and deny entry of a vehicle into a facility. The sensors capture image frames of the vehicle. The server and the computing device each store portions of a computer vision model. The computer vision model includes a client layer, an application layer, an image processing layer, a data layer, a business logic layer, and an integration layer. The client layer receives commands from an operator that are processed by the application layer. The data layer retrieves data objects associated with the vehicle. The image processing layer produces image data from the image frames. The integration layer receives and transmits the image data. The business logic layer outputs a recommendation, depicted on the display, to actuate the access gateway based upon the image data and the data objects.

20 Claims, 7 Drawing Sheets

(58) Field of Classification Search
USPC .......................................................... 348/148
See application file for complete search history.

(56) References Cited

U.S. PATENT DOCUMENTS

| | | | | |
|---|---|---|---|---|
| 6,532,066 | B1 * | 3/2003 | Filev | G01N 21/8422 356/600 |
| 7,023,540 | B2 * | 4/2006 | Ringler | G01N 21/8806 250/462.1 |
| 7,889,931 | B2 | 2/2011 | Webb et al. | |
| 8,365,580 | B2 * | 2/2013 | Stumpf | G01M 17/007 73/592 |
| 10,063,758 | B2 * | 8/2018 | Scheich | H04N 23/90 |
| 10,401,302 | B2 * | 9/2019 | Röckle | G01M 11/081 |
| 10,692,242 | B1 | 6/2020 | Morrison et al. | |
| 10,939,023 | B2 * | 3/2021 | Scheich | H04N 23/50 |
| 10,949,672 | B1 * | 3/2021 | Tang | G06N 3/08 |
| 10,976,262 | B2 * | 4/2021 | Ozim | G01B 11/2513 |
| 11,244,209 | B2 | 2/2022 | Hoshino | |
| 11,244,438 | B2 | 2/2022 | Ranca et al. | |
| 11,270,129 | B2 * | 3/2022 | Petrey, Jr. | G06V 20/63 |
| 11,333,615 | B2 * | 5/2022 | Grauzinis | G01N 21/8806 |
| 11,386,668 | B2 | 7/2022 | Wijata | |
| 11,557,156 | B1 * | 1/2023 | Knas | G06T 7/001 |
| 11,570,369 | B1 * | 1/2023 | Swinford | H04N 7/18 |
| 11,574,395 | B2 * | 2/2023 | Dev | G06T 7/0004 |
| 11,580,800 | B2 | 2/2023 | Ghosh et al. | |
| 11,710,158 | B2 | 7/2023 | Kumar et al. | |
| 11,713,060 | B2 | 8/2023 | Gross et al. | |
| 12,061,411 | B2 * | 8/2024 | Scheich | G03B 15/06 |
| 12,140,501 | B1 * | 11/2024 | Hever | G01N 21/8851 |
| 12,154,401 | B1 * | 11/2024 | Gourlay | G07C 9/10 |
| 12,183,084 | B2 * | 12/2024 | Rodriguez | G08G 1/149 |
| 12,235,187 | B2 * | 2/2025 | Utting | B60S 3/002 |
| 12,277,585 | B2 * | 4/2025 | Garcia, III | G06T 13/80 |
| 12,367,571 | B1 * | 7/2025 | Brighton | G01N 21/8851 |
| 12,409,952 | B1 * | 9/2025 | Brajovic | B64F 5/60 |
| 2004/0002894 | A1 * | 1/2004 | Kocher | G07C 9/28 705/13 |
| 2004/0062348 | A1 * | 4/2004 | Jeng | G01N 21/8903 378/57 |
| 2006/0114531 | A1 * | 6/2006 | Webb | G01N 21/8851 359/15 |
| 2008/0016119 | A1 * | 1/2008 | Sharma | G05B 19/41875 |
| 2008/0147246 | A1 * | 6/2008 | Cochran | G07C 9/257 701/1 |
| 2008/0208609 | A1 * | 8/2008 | Preece | G06Q 10/06 705/1.1 |
| 2009/0121897 | A1 * | 5/2009 | Muhlethaler | G07C 9/253 340/908 |
| 2009/0261966 | A1 * | 10/2009 | Cutchis | G08B 13/19647 340/522 |
| 2013/0070056 | A1 * | 3/2013 | Tripathi | G06Q 10/06 382/104 |
| 2014/0232518 | A1 * | 8/2014 | Stoehr | G07B 15/04 340/5.6 |
| 2016/0042575 | A1 * | 2/2016 | Ganguly | G07B 15/02 705/13 |
| 2017/0084091 | A1 * | 3/2017 | Mcquade | B60W 50/045 |
| 2017/0147990 | A1 * | 5/2017 | Franke | G06Q 10/1093 |
| 2017/0148102 | A1 * | 5/2017 | Franke | G06Q 10/1093 |
| 2017/0287333 | A1 * | 10/2017 | Harada | G06V 20/56 |
| 2018/0268238 | A1 * | 9/2018 | Khan | G06V 10/751 |
| 2019/0235126 | A1 * | 8/2019 | Petruk | H04N 23/698 |
| 2019/0304214 | A1 * | 10/2019 | Mentele | G07C 5/0825 |
| 2019/0304220 | A1 * | 10/2019 | Lee | E01F 13/08 |
| 2020/0175783 | A1 * | 6/2020 | Adams | G07C 5/0808 |
| 2020/0410788 | A1 * | 12/2020 | Uchiyama | G01M 17/007 |
| 2021/0090242 | A1 * | 3/2021 | Hever | G06T 17/20 |
| 2021/0174117 | A1 * | 6/2021 | Hever | G06F 18/25 |
| 2021/0241438 | A1 * | 8/2021 | Megherby | G06Q 40/08 |
| 2021/0272387 | A1 * | 9/2021 | Heard | G07C 5/0825 |
| 2021/0312568 | A1 | 10/2021 | Alami et al. | |
| 2021/0325313 | A1 * | 10/2021 | Kasavala | G01B 11/2513 |
| 2021/0398271 | A1 * | 12/2021 | Lee | G06T 7/001 |
| 2022/0005288 | A1 * | 1/2022 | Taguchi | G07B 15/063 |
| 2022/0114561 | A1 * | 4/2022 | Watts | G06Q 10/20 |
| 2022/0277642 | A1 * | 9/2022 | Fukushima | G08B 13/19682 |
| 2022/0358775 | A1 * | 11/2022 | Hantehzadeh | G06T 7/11 |
| 2022/0382262 | A1 * | 12/2022 | Arthur | G05B 19/41875 |
| 2023/0162243 | A1 * | 5/2023 | Southin | G06T 7/0004 705/306 |
| 2023/0202533 | A1 * | 6/2023 | Nativ | B61B 13/06 104/28 |
| 2023/0206942 | A1 * | 6/2023 | Schneider | G01M 15/12 704/200 |
| 2023/0334866 | A1 | 10/2023 | Kirschner et al. | |
| 2023/0342937 | A1 | 10/2023 | Hever et al. | |
| 2023/0368500 | A1 * | 11/2023 | Ma | G06V 10/82 |
| 2024/0133772 | A1 * | 4/2024 | Dangur | G06Q 10/08 |
| 2024/0247976 | A1 * | 7/2024 | Silva | G06Q 10/00 |
| 2024/0311924 | A1 * | 9/2024 | Dev | G06T 7/001 |
| 2024/0320751 | A1 | 9/2024 | Chatfield et al. | |
| 2024/0329656 | A1 * | 10/2024 | Iwahori | G05D 1/249 |
| 2024/0404041 | A1 * | 12/2024 | Hever | G06T 7/12 |
| 2025/0001898 | A1 * | 1/2025 | Schneider | B60L 53/665 |
| 2025/0029434 | A1 * | 1/2025 | Birgiolas | G06N 3/0464 |
| 2025/0043615 | A1 * | 2/2025 | Trail | B65G 69/2882 |
| 2025/0045847 | A1 * | 2/2025 | Marsousi | G06Q 50/10 |
| 2025/0045897 | A1 * | 2/2025 | Ikoma | G01B 11/30 |
| 2025/0069400 | A1 * | 2/2025 | Kelly | G06T 7/73 |
| 2025/0069401 | A1 * | 2/2025 | Daniels | G06Q 10/0833 |
| 2025/0083719 | A1 * | 3/2025 | Amouie | B61L 23/044 |
| 2025/0086975 | A1 * | 3/2025 | Amouie | G06T 7/80 |
| 2025/0097388 | A1 * | 3/2025 | Jarkoi | H04N 23/52 |
| 2025/0124558 | A1 * | 4/2025 | Hoshino | G06T 7/0002 |
| 2025/0156774 | A1 * | 5/2025 | Barole | B61L 23/041 |
| 2025/0166440 | A1 * | 5/2025 | Moriyama | G06V 40/172 |
| 2025/0187637 | A1 * | 6/2025 | Qin | G05D 1/689 |
| 2025/0232432 | A1 * | 7/2025 | Hirata | G06T 7/001 |
| 2025/0242829 | A1 * | 7/2025 | Bandi | G06V 10/751 |
| 2025/0276706 | A1 * | 9/2025 | Roberts | B60W 50/0205 |
| 2025/0299319 | A1 * | 9/2025 | Engel | G06T 7/70 |
| 2025/0342608 | A1 * | 11/2025 | Wengeler | G06T 7/70 |

* cited by examiner

84

| 85 | 96 | 109 | 111 | 113 | 115 | 117 | 119 |
|---|---|---|---|---|---|---|---|
| Internal Identification Number | License Plate Number | Location | Date and Time | Mechanical Defects? (Y/N) | Valid Paperwork (Y/N?) | Auxiliary Defects? (Y/N) | Access Granted (Y/N) |
| Tanker-1 | 3692 HTS | (Dhahran Bulk Plant) | 11/1/2024 8:43 AM EST | N | Y | N | Y |
| Tanker-1 | 5984 VJX | (Abha Bulk Plant) | 10/31/2024 1:53 PM EST | Y Leaking fluids | Y | N | N |
| Tanker-2 | 7653 TJN | (Najran Bulk Plant) | 10/19/2024 9:24 AM EST | N | N No DOT tag | Y Improperly secured tie-down strap | N |
| Tanker-3 | 1964 RGD | (Dhahran Bulk Plant) | 11/1/2024 12:58 PM EST | N | Y | N | Y |
| Tanker-1 | 3692 HTS | (Jubail Bulk Plant) | 11/4/2024 9:23 AM EST | Y Cracked windshield | N No insurance on file for vehicle | N | N |

FIG. 5

COMPUTER VISION BASED REAL TIME SAFETY AND COMPLIANCE SYSTEM FOR VEHICLE ACCESS CONTROL

BACKGROUND

Inspection checkpoints or other traffic stops are implemented at access points to an area in order to offer increase entry and exit security. For example, an inspection station may be implemented at a border between two countries in order to ensure that vehicles entering or exiting a country abide by import and export restrictions. Similarly, inspection stations may be implemented in local instances to control the security of an associated facility, such as a facility that stores secure data. Manual labor is typically utilized to conduct inspections of vehicles at the inspection station. However, manual inspection is challenging, labor-intensive, time consuming, and subject to human error. As a result, the industry faces a significant challenge in ensuring quality control, reducing costs, and improving customer satisfaction at inspection checkpoints. It is further desirable to produce objective and consistent inspection results that reduce subjective interpretation and related biases.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A system includes an access gateway, sensors, a server, a first data connection, a computing device, a second data connection, a server, and a display. The access gateway actuates in order to selectively permit and deny entry of a vehicle into a facility. The sensors capture image frames of the vehicle. The server includes a first processor and a first memory. The first processor executes a first set of computer readable instructions forming a first portion of a computer vision model. The first memory stores the image frames and the first set of computer readable instructions. The first data connection transmits the image frames from the sensors to the server. The computing device includes a second processor and a second memory. The second processor executes a second set of computer readable instructions forming a second portion of the computer vision model. The second memory stores the second set of computer readable instructions. The second data connection facilitates data transfer between the computing device and the server. The display depicts, to an operator of the access gateway, a recommendation of whether the access gateway should be actuated. The computer vision model includes a client layer, an application layer, an image processing layer, a data layer, a business logic layer, and an integration layer. The client layer displays a Graphical User Interface (GUI) to the operator and receives commands therefrom. The application layer processes the commands received from the operator. The image processing layer performs object detection processes and text extraction processes on the image frames and produces image data. The data layer retrieves data objects associated with the vehicle from an external database. The business logic layer determines and outputs the recommendation of whether the access gateway should be actuated based upon the image data and the data objects. The integration layer receives the image data from the image processing layer and transmits the image data to the business logic layer.

A method includes capturing image frames of a vehicle with sensors. The method also includes transmitting the image frames from the sensors to a server with a first data connection. The method further includes storing the image frames with a first memory of the server. A first set of computer readable instructions forming a first portion of a computer vision model is stored on the first memory of the server. A second set of computer readable instructions forming a second portion of the computer vision model is stored on a second memory of a computing device. A second data connection transfers data between the computing device and the server. The method further includes executing the first portion of the computer vision model with a first processor of the server and executing the second portion of the computer vision model with a second processor of the computing device. Executing the first portion and the second portion of the computer vision model includes performing object detection processes and text extraction processes on the image frames with an image processing layer, thereby producing image data. The method also includes retrieving data objects associated with the vehicle from an external database with a data layer. The image data is received from the image processing layer with an integration layer, and the integration layer transmits the image data to a business logic layer. In addition, the method includes determining and outputting a recommendation of whether an access gateway should be actuated based upon the image data and the data objects with the business logic layer. The method further includes displaying a Graphical User Interface (GUI) to an operator with a client layer, receiving commands from the operator with the client layer, and processing the commands received from the operator with an application layer. A display depicts the recommendation to the operator and actuates the access gateway in order to selectively permit and deny entry of the vehicle into a facility based upon the recommendation.

Any combinations of the various embodiments and implementations disclosed herein can be used in a further embodiment, consistent with the disclosure. Other aspects and advantages of the claimed subject matter will be apparent from the following description and the claims.

BRIEF DESCRIPTION OF DRAWINGS

Specific embodiments of the disclosed technology will now be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility.

FIG. 5 depicts a report table in accordance with one or more embodiments disclosed herein.

DETAILED DESCRIPTION

Specific embodiments of the disclosure will now be described in detail with reference to the accompanying figures. In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not intended to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, one or more embodiments of the present invention are directed towards a computer vision-based system for inspecting vehicles. The computer model utilizes video feeds captured by cameras and processed by computer vision applications to analyze various aspects of the vehicle as it passes through an access control point such as an access gateway. The computer vision model further generates reports detailing information on the vehicle, as well as a recommendation of whether to allow the vehicle through the access gateway. As a result of utilizing a computer vision model with object detection processes coupled with an unstructured NoSQL database storing vehicle information, the computer vision system is capable of processing large amounts of data rapidly, leading to improved productivity and reduced errors and subjective biases.

Figure 1:
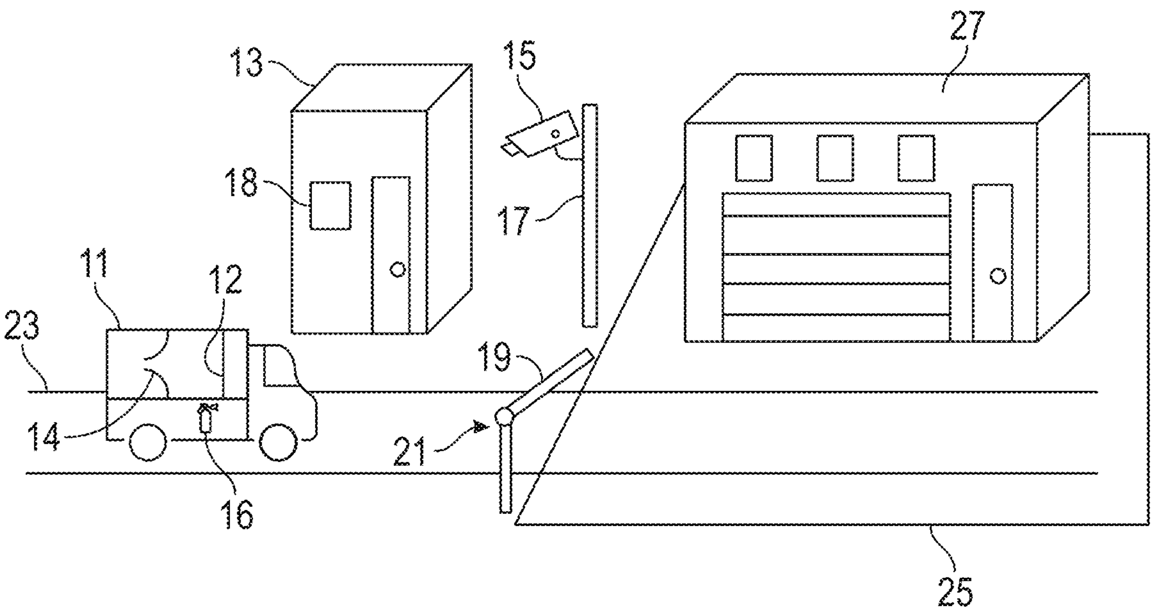
FIG. 1 depicts a vehicle approaching a gateway access system and an inspection station in accordance with one or more embodiments disclosed herein.

FIG. 1 depicts a vehicle 11 traversing a road 23. The road 23 is a concrete surface that the vehicle 11 traverses to reach a particular destination. The vehicle 11 may include a heavy duty vehicle such as a semi-truck, a pick up truck, a tanker, or construction vehicles, or a light duty vehicle such as a sedan, a light duty pick up truck, or similar vehicles. The particular structure and type of vehicle is not intended to limit the functionality of a computer vision model (e.g., FIG. 3) as described herein. The vehicle 11 includes a fire extinguisher 16, which forms one example of safety equipment as discussed herein. Other safety equipment may include a first aid kit, an emergency kit, a jumper cable, a road flare, and similar roadside safety equipment that aids the driver in the event of a minor or major emergency. The vehicle 11 is used to transport tangible goods (not shown) to the facility 25, and the tangible goods (not shown) are held to the vehicle 11 with straps. In FIG. 1, the straps include a secured strap 12 that functions properly to hold the goods to the vehicle 11, and further include a severed strap 14 that has broken during vehicle 11 travel. The secured strap 12, the severed strap 14, and the fire extinguisher 16 form examples of safety equipment inspected with a computer vision model (e.g., FIG. 3) as discussed further below.

An access gateway 21 is positioned adjacent to the road 23. The access gateway 21 includes a gateway arm 19, which is a boom arm formed as a rotating structural member that serves to selectively permit or deny entry of the vehicle 11 into a facility 25. The gateway arm 19 is actuated by a motor (not shown) of the access gateway 21 based upon a command issued by an operator inside of an inspection station 13 as discussed further below. The inspection station 13 is positioned adjacent to the road 23. In FIG. 1, the inspection station 13 is positioned on an opposite side of the road 23 from the access gateway 21. In other embodiments, the inspection station 13 may be located on the same side of the road as the access gateway 21, or located remotely.

In general, the access gateway 21 forms one example of a mechanism for controlling entry into a facility 25, and the access gateway 21 is positioned on or adjacent to a border of the facility 25. In the context of this application, the term "facility" refers to a secured location, typically a plot of land, as well as features thereof. The secured location may include a building 27 that processes sensitive data, stores business secrets, or houses hazardous materials, for example. The particular identity and function of the facility 25 may vary in real-world embodiments of a computer vision model (e.g., FIG. 3) as described herein, and the type of facility 25 does not limit the potential use cases of the computer vision model (e.g., FIG. 3). Although not depicted in FIG. 1, the facility 25 may include additional security measures such as a fence delimiting boundaries of the facility 25. Similarly, in one or more alternative embodiments, the access gateway 21 may instead include a door such as a garage door, a gate, or similar entry control devices as will be appreciated by a person skilled in the art. Furthermore, although the inspection station 13 is depicted in FIG. 1 as being located outside of the facility 25, the inspection station 13 may be located within the facility 25. The inspection station 13 may be located before or after the access gateway 21 relative to the road 23 and the vehicle 11. That is, the inspection station 13 may be located on the plot of land denoted as the facility 25, rather than external thereto.

A security camera 19 is positioned to monitor the vehicle 11 as the vehicle 11 approaches the access gateway 21. The security camera 15 is mounted on a camera pole 17, which is a structural member formed of metal or concrete that allows the gateway arm 19 to be mounted in the air so as to monitor an area of the road 23 adjacent to the vehicle inspection station 13. The camera pole 17 may be mounted inside of the facility 25, inline with the access gateway 21 (i.e., on the border of the facility 25), or in front of the access gateway 21. The camera pole 17 includes an interior cavity (not shown) that allows power and data transfer cables (not shown) to be connected from the ground to the security camera 15. The security camera 15 may be embodied as an outdoor security camera with weatherproofing features (e.g., a protective cover, waterproofing gaskets, etc.) when mounted on a camera pole 17 exposed to the natural elements. The security camera 15 is typically embodied as a Closed-Circuit Television (CCTV) bullet camera with a Power over Ethernet (POE) connection. Alternatively, the security camera 15 may be wireless, and may be battery powered, solar powered, or utilize a separate power cable passing through the camera pole 17 as discussed above.

For its part, the inspection station 13 is a building that offers protection from the weather to an operator of the access gateway 21. The inspection station 13 includes a window 18 positioned so that the operator may view the vehicle 11 as the vehicle 11 approaches the access gateway 21. Typically, the operator performs manual vehicle 11 inspections by the viewing the vehicle 11 via the security camera 15 or through the window 18, and manually verifying whether the vehicle 11 should be permitted entry to the facility 25 based on various inspection criterion. In other cases, the operator may be required to exit the inspection station 13 and approach the vehicle 11 to closely inspect portions of the vehicle 11. However, such a process relies heavily or entirely on the operator for the inspection process, and is necessarily subject to human bias and error. Additionally, it can take a relatively lengthy period of time, on the order of minutes, for a vehicle 11 to be inspected by an operator of the inspection station during manual inspections, leading to traffic buildup when multiple vehicles 11 are present.

A computer vision model (e.g., FIG. 3) as discussed herein remedies the above defects by performing an automatic inspection of the vehicle 11 within a shorter period of time, on the order of seconds, while also presenting the operator with a detailed report of vehicle 11 inspection items. The use of the computer vision model (e.g., FIG. 3) thus reduces the workload of the operator, allowing the operator to direct their attention to specific inspection checklist items. As discussed further below, the computer vision model (e.g., FIG. 3) provides the operator with a recommendation of whether or not the vehicle 11 should be permitted entry into the facility 25. Alternatively, the computer vision model (e.g., FIG. 3) may replace the human operator entirely, and operate the access gateway 21 without human intervention. Specific details regarding the computer vision model (e.g., FIG. 3) and vehicle 11 inspection processes utilized thereby are discussed further below.

The process of inspecting the vehicle 11 that passes through the access gateway 21 may be initiated in numerous ways. As one example, the computer vision model (e.g., FIG. 3) may initiate vehicle inspection upon detecting that a large object occupies a significant portion of an image received from the security camera 15, indicating that the vehicle 11 has approached the access gateway 21. Alternatively, the inspection process may be initiated manually by the operator, or by the computer vision model (e.g., FIG. 3) receiving a signal from a proximity sensor (not shown) of the inspection station 13 or the access gateway 21.

Figure 3:
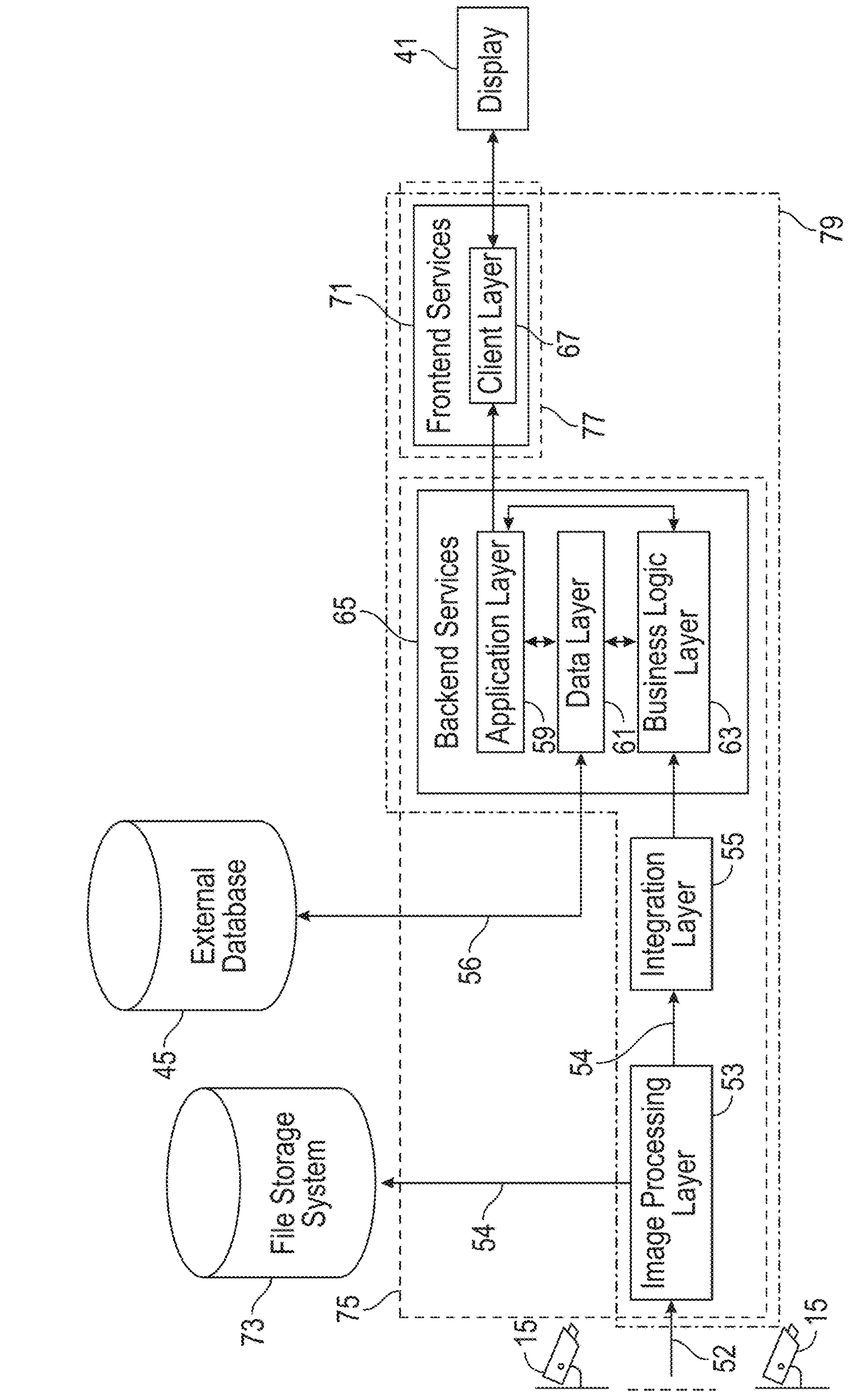
FIG. 3 depicts a block diagram of a computer vision model in accordance with one or more embodiments disclosed herein.

The security camera 15 captures image frames of the vehicle 11, and the image frames are sent to the inspection station 13 where the image frames are processed by the computer vision model (e.g., FIG. 3). The computer vision model (e.g., FIG. 3) analyzes various aspects of the vehicle 11 to detect, classify and quantify defects, violations, abnormalities or specific features of interest as discussed below.

Subsequently, the inspection station 13 processes and analyzes visual data and provides reports on the vehicle 11 quality, conformance to standards, or adherence to specific criteria. If the vehicle 11 meets the specific criteria, the computer vision model (e.g., FIG. 3) outputs a recommendation to the operator that the vehicle 11 should be permitted entry to the facility 25. The computer vision model (e.g., FIG. 3) proceeds to receive an input from the operator and retain the access gateway 21 in a closed position or actuate the access gateway 21 to an open position based on the operator's input. Thus, overall, the computer vision model (e.g., FIG. 3) incorporates various software functions and hardware devices to facilitate the process of inspecting a vehicle 11 and allowing or denying the vehicle 11 access to the facility 25.

Figure 2:
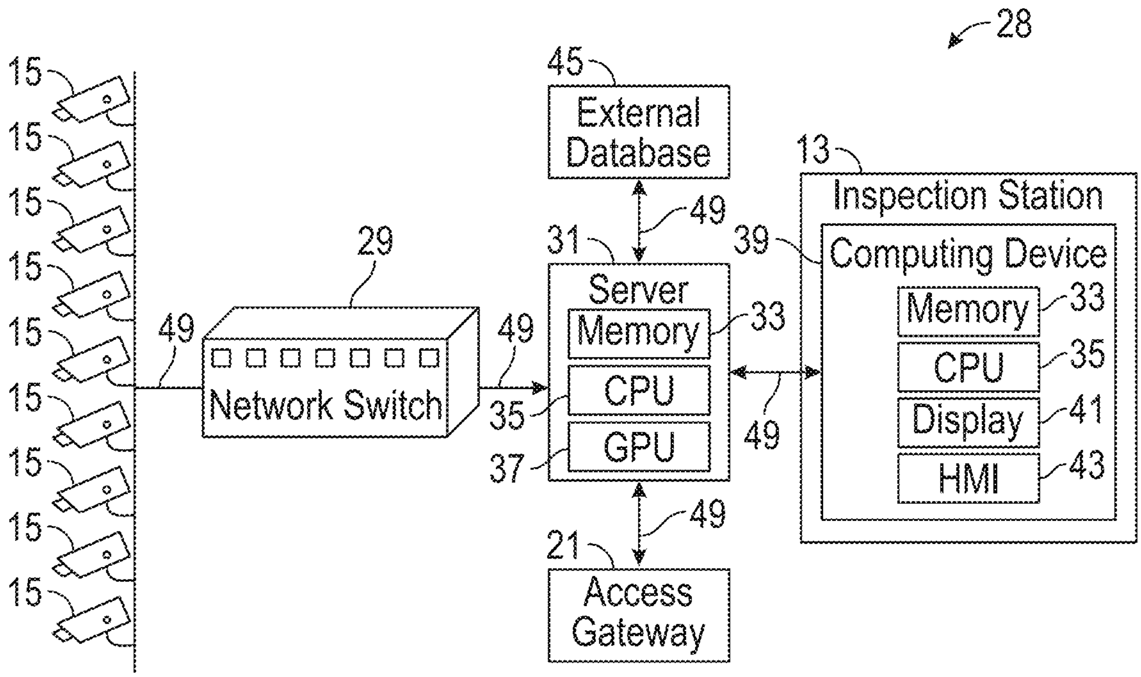
FIG. 2 depicts a block diagram of hardware used by a computer vision model in accordance with one or more embodiments disclosed herein.

FIG. 2 depicts a hardware diagram of a system 28 for executing a computer vision model (e.g., FIG. 3) in accordance with one or more embodiments disclosed herein. Specifically, FIG. 2 depicts that the system 28 includes a plurality of security cameras 15, a network switch 29, a server 31, an access gateway 21, an external database 45, and an inspection station 13. As discussed above in relation to FIG. 1, the computer vision model (e.g., FIG. 3) executed using hardware of the system 28 functions to determine whether a vehicle 11 should be allowed to enter the facility 25 via the access gateway 21.

The plurality of security cameras 15 serve to capture images of the vehicle 11. The network switch 29 functions to connect the security cameras 15 to the server 31 using an Internet Protocol (IP). Thus, the network switch 29 functions to transfer images forming the video feeds captured by the security cameras 15 to the server 31. The network switch 29 may be embodied as a Power over Ethernet (POE) switch that provides power and data transmission capabilities to each security camera 15 via an ethernet cable, for example. Alternatively, the network switch 29 may be embodied as an ethernet switch or other Local Area Network (LAN) switch and the security cameras 15 may have a dedicated power line as discussed above.

The network switch 29 is connected to the security cameras 15 via a data connection 49, which is a wired LAN connection such as an ethernet cable as discussed above. Similarly, the network switch 29 is connected to the server 31 via a data connection 49 embodied as a wired LAN connection. In one or more alternative embodiments, the data connection 49 may be embodied as a wireless connection such as Wi-Fi. Separate data connections 49, which may be wired or wireless data connections (e.g., ethernet, Universal Serial Bus (USB), Wi-Fi, an Internet Protocol (IP) connection, etc.), connect the server 31 to the external database 45, the inspection station 13, and the access gateway 21.

The server 31 includes a memory 33, a Central Processing Unit (CPU) 35, and a Graphics Processing Unit (GPU) 37. The CPU 35 is formed by one or more processors, integrated circuits, microprocessors, or equivalent computing structures that execute computer readable instructions stored on the memory 33. The GPU 37 also executes computer readable instructions forming another portion of the computer vision model (e.g., FIG. 3) stored on the memory 33. The CPU 35 performs serial processing such as numerical computations and processed as described herein, and the GPU 37 serves to perform parallel processing for processing images captured by the security cameras 15. The CPU 35 and the GPU 37 are each formed by one or more processors, integrated circuits, microprocessors, or equivalent computing structures that serve to execute computer readable instructions stored on the memory 33. For its part, the memory 33 includes a non-transitory storage medium such as a Hard Disk Drive (HDD), a Solid State Drive (SSD), or equivalent storage devices. The memory 33 serves to store at least a portion of the computer vision algorithm (e.g., FIG. 3) as discussed further below.

The server 31 is connected to an external database 45 via a data connection 49 as discussed above. The external database 45 is configured as a Not-only-Structured Query Language (NoSQL) database that stores data objects (i.e., documents) associated with the vehicle 11. Examples of NoSQL databases and data contained thereby are further discussed in relation to FIGS. 4A and 4B, below. The external database 45 may be practically embodied as an existing off-the-shelf database system such as MongoDB or Apache Cassandra. Alternatively, the external database 45 may be embodied as an SQL database storing vehicle 11 associated data in table format.

The inspection station 13 is discussed above in relation to FIG. 1, and includes a computing device 39 for outputting information to an operator and receiving input therefrom. The computing device 39 also includes a memory 33 and a CPU 35. The memory 33 of the computing device 39 stores the remainder of the computer vision model (e.g., FIG. 3), which is executed by the CPU 35 of the computing device 39. The memory 33 of the computing device 39 includes a non-transient storage medium and the CPU 35 includes one or more processors or similar computing circuits as discussed above. The HMI 43 may be embodied, for example, as peripheral computer components such as a touchscreen, stylus, keyboard, mouse, a combination thereof, or equivalent devices. The display 41 may be embodied as a monitor, a Liquid Crystal Display (LCD) panel, or an Organic Light Emitting Diode (OLED) panel. Alternatively, the HMI 43 and the display 41 may be combined in a single package as a touchscreen display without departing from the nature of this specification.

The computing device 39 may be embodied as a desktop computer, a laptop, a tablet computer, or a cell phone. In addition, although the computing device 39 is described herein as being located inside the inspection station 13, such is not necessary and the computing device 39 may be located external thereto or remotely located, such as in a case where the computing device 39 is located in the building 27 and the inspection station 13 is omitted. Consistent with the above, the data connection 49 connecting the server 31 to the inspection station 13 may be a wired or wireless connection, and may be an IP connection, a WAN connection, or LAN connection.

Turning to FIG. 3, FIG. 3 depicts block diagram overview of a computer vision model 79 consistent with one or more embodiments described herein. The computer vision model 79 includes an image processing layer 53, an integration layer 55, a backend services block 65, and a frontend services block 71, each of which are discussed further below. The image processing layer 53 performs video pre-processing functions such as video decoding and batching, and post-processing functions such as video rendering and video analytics tracking. The image processing layer 53 also performs object detection processes and text extraction processes on the image frames 52 generated by the security cameras 15. Such object detection processes include machine learning inference processes using decision trees. For example, the machine learning portion of the image processing layer 53 may include a Convolutional Neural Network (CNN) such as Residual Network (ResNet) that functions to identify objects in the images 52 and output identified objects as image data 54.

The CNN is trained on a database of images containing vehicles and equipment stored thereon. For example, the CNN of the image processing layer 53 is trained using test images containing fire extinguishers located on a tanker such that the CNN is ultimately configured to detect fire extinguishers 16 forming safety equipment of the vehicle 11. Similarly, the CNN is trained using images of a severed strap 14 and a secured strap 12 to identify whether a particular strap of a vehicle 11 is properly functioning. Other examples of image data 54 generated by the image processing layer 53 include a license plate number of the vehicle 11, mechanical defects (e.g., leaking fluids, damaged or absent body panels, cracked windshields, etc.) associated with the vehicle 11, a number or volume of goods transported by the vehicle, and a number of safety equipment present on the vehicle. The image data 54 is text data indicating the identity (i.e., an object class) and location (i.e., a bounding box location expressed as pixel locations of an input image frame 52) of detected objects.

The image data 54 is sent to both a file storage system 73 and the integration layer 55. The file storage system 73 may be embodied as the memory 33 of the server 31 or the computing device 39, or alternatively as a standalone memory device such as an external hard drive. The file storage system 73 serves to store backups of video feeds captured by the security cameras 15 in the event that the security footage may need to be reviewed (e.g., in order to perform root cause analysis of a security breach of the facility 25).

The integration layer 55 is configured to receive the image data 54 from the image processing layer 53 and transmit the image data 54 to a business logic layer 63 of the backend services block 65. As described herein, the integration layer 55 is embodied as a message broker that serves to facilitate data transmission between the CNN of the image processing layer 53 and the business logic layer 63. The business logic layer 63 may be embodied in many different forms, including algorithms such as a Gradient-Boosted Decision Tree (GBDT), a neural network, deep learning techniques, or similar decision making algorithms and processes. Because the business logic layer 63 is formed as a distinct software layer from the image processing layer 53, the integration layer 55 functions to convert image data 54 output by the image processing layer 53 into an acceptable format for input into the business logic layer 63. It will be appreciated by a person skilled in the art that the precise data conversion and message brokerage processes employed by the integration layer 55 will thus vary according to the contemplated use case of the computer vision model 79 and the structure of the system 28 discussed in FIG. 2. By way of nonlimiting examples, the integration layer 55 may have a partitioned log model or a messaging queue architecture, and may use a publisher/subscriber protocol (i.e., Message Queuing Telemetry Transport (MQTT) protocol) or a queue based protocol (i.e., Advanced Message Queuing Protocol (AMQP)).

Once the business logic layer 63 receives the image data 54, the business logic layer 63 retrieves data objects 56 from the external database 45 via the data layer 61 of the backend services block 65. Data objects 56 associated with the vehicle 11 are discussed in detail in relation to FIGS. 4A and 4B, below. Briefly, the data objects 56 include documents containing information associated with the vehicle that may not be able to be explicitly derived from the image frames 52. For example, the data objects 56 may include documents describing insurance information associated with the vehicle 11, where the insurance information is retrieved from the external database 45 rather than determined from the image frames 52. The data layer 61 performs message brokerage and data pre-processing services similar to the integration layer 55. However, where the integration layer 55 transmits text based image data 54 from the image processing layer 53 to a decision making algorithm of the business logic layer 63 using LAN messaging protocols, the data layer 61 is configured to access the external database 45 via an IP or similar WAN and feed the unstructured data objects to the business logic layer 63. The data layer 61 may utilize publisher/subscriber or query based messaging to retrieve data objects from the external database 45. In addition, the data layer 61 may include data pre-processing and formatting functions to reformat data received from the external database 45 to be input into the business logic layer 63.

As noted above, the business logic layer 63 includes a GBDT algorithm, a neural network, deep learning techniques, or similar decision making algorithms and processes that serve to determine whether a vehicle 11 should be permitted entry to the facility 25. The determination is based upon the image data 54 received from the integration layer 55 and the data objects 56 received via the data layer 61. The determination process is discussed further below. In general, the determination process involves the business logic layer 63 determining whether certain objects are identified or not identified via the image data 54, and whether or not specific valid data objects 56 are retrieved from the external database 45 by the data layer 61. Such determinations may be referred to as "checks" made by the computer vision model 79, and if the vehicle 11 fails a check denial of entry is recommended by the business logic layer 63. Conversely, if the vehicle 11 passes all of the checks employed by the business logic layer 63 then the business logic layer 63 outputs a recommendation to allow entry of the vehicle 11 into the facility 25. Arrows connected to the business logic layer 63 denote bidirectional information transfer between various other layers of the computer vision model 79 and the business logic layer 63.

Figure 6:
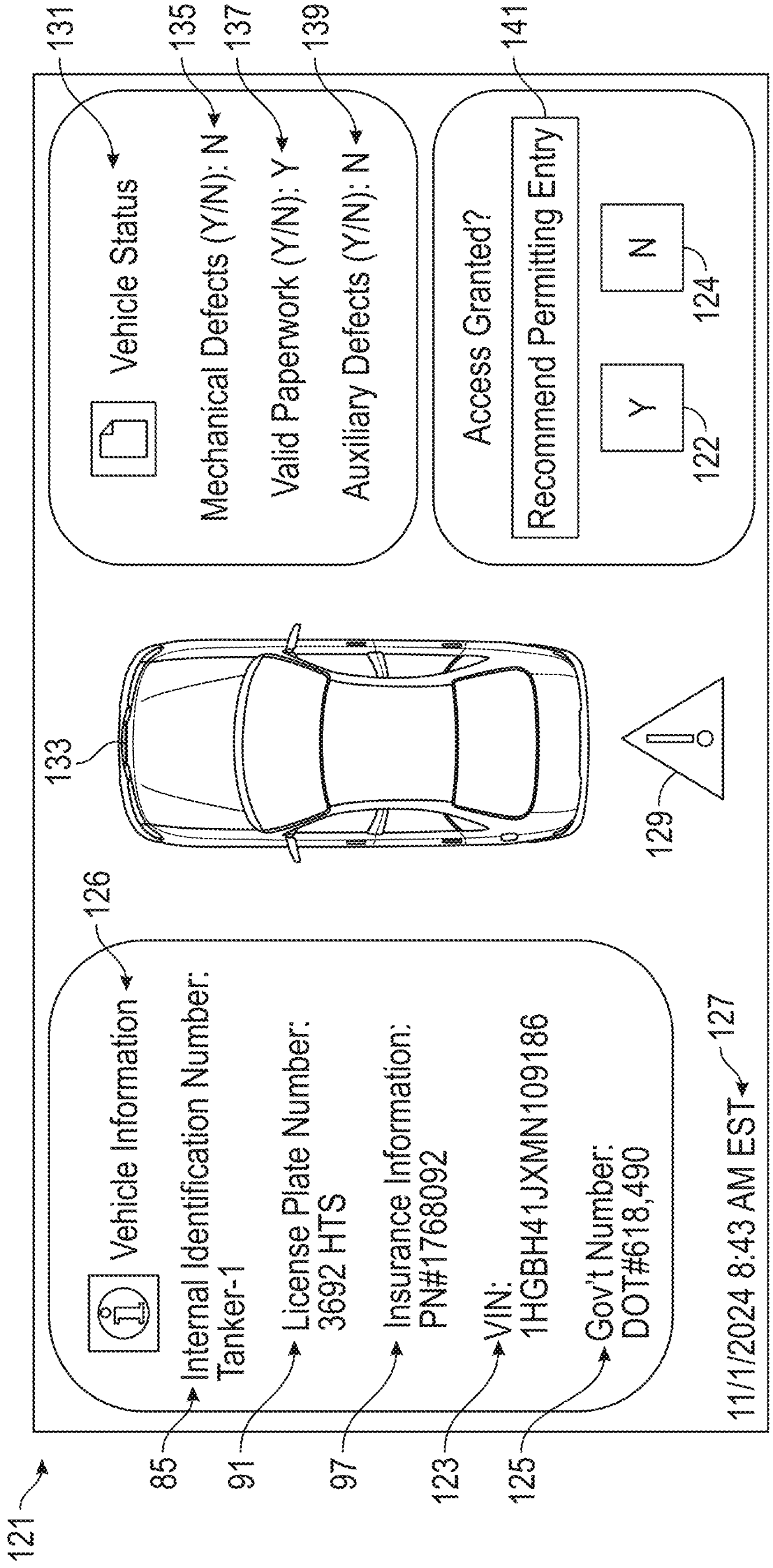
FIG. 6 depicts Graphical User Interface (GUI) in accordance with one or more embodiments disclosed herein.

The application layer 59 receives the recommendation from the business logic layer 63 and generates a report detailing the determination results. Such a report is depicted in FIG. 6, below, and includes a brief overview of whether the vehicle 11 passed the inspection check as well as data associated with the vehicle 11. In addition to generating the report, the application layer 59 also includes functions for generating time-series entry logs into the facility 25 as well as performing other user requested functions (e.g., viewing a live feed from a specific security camera 15, retrieving stored video feeds from the file storage system 73, extracting Key Performance Indicators (KPIs). etc.). The application layer 59 further includes functions such as load balancing, caching, reverse proxying, request routing, and other web service functions. To control access to the computer vision model 79, the application layer 59 may include authentication features such as password authentication or multi-factor authentication (MFA) to prevent unauthorized access to the facility 25.

As shown in FIG. 3, the image processing layer 53, the integration layer 55, and the backend services 65 forms a server side portion 75 of the computer vision model 79. The image processing layer 53, the integration layer 55, and the backend services 65 are stored on the memory 33 of the server 31 and executed by the CPU 35 and the GPU 37 of the server 31. The remainder of the computer vision model 79 including the frontend services 71 and the user interface layer 69 forms a client side portion 77 of the computer vision model 79. The frontend services 71 and the user interface layer 69 are stored on the memory 33 of the computing device 39 and executed by the CPU 35 thereof. The computer vision model 79 is thus executed in a distributed computing environment where a first portion of the computer vision model 79 is stored on the server 31 and a second portion of the computer vision model 79 is stored on the computing device 39.

The particular layers included in the server side portion 75 and the client side portion 77 may vary depending on the computational capabilities of the server 31 and the computing device 39. For example, in one or more alternate embodiments the backend services 65 may be stored on and executed by the computing device 39 rather than the server 31 such that the integration layer 55 forms an output layer of the server 31. Alternatively, the server 31 and the computing device 39 may be embodied as a single device, in which case server side and client side designations are inapplicable. Such may be the case if the inspection station 13 is an offline remote station with security cameras 15 attached or adjacent thereto such that a server 31 is unnecessary for optimal processing efficiency. It yet another embodiment multiple computing devices 39 may be connected to the server 31, in which case the computer vision model 79 may be partitioned between at least three distinct devices. As a result, it will be appreciated by a person skilled in the art that the architecture and distribution of the computer vision model 79 as a whole may vary according to the contemplated environment for vehicle 11 inspection.

Keeping with FIG. 3, the frontend services 71 include a client layer 67. The client layer 67 includes User Interface (UI) rendering functions for providing a GUI to the operator. The GUI is rendered as a web page accessible using a commercially available internet application of the computing device 39. The GUI may be accessed via a WAN connection using a Uniform Resource Locator (URL) address associated with the client layer 67. Alternatively, the web page forming the GUI may be hosted on the server 31, in which case computer vision model 79 may be accessed via a LAN connection by inputting the address of the server and the application path of the computer vision model 79. The client layer 67 renders the GUI on a display 41 of the computing device 39 in order to present the GUI to the operator of the inspection station 13.

Figure 4A:
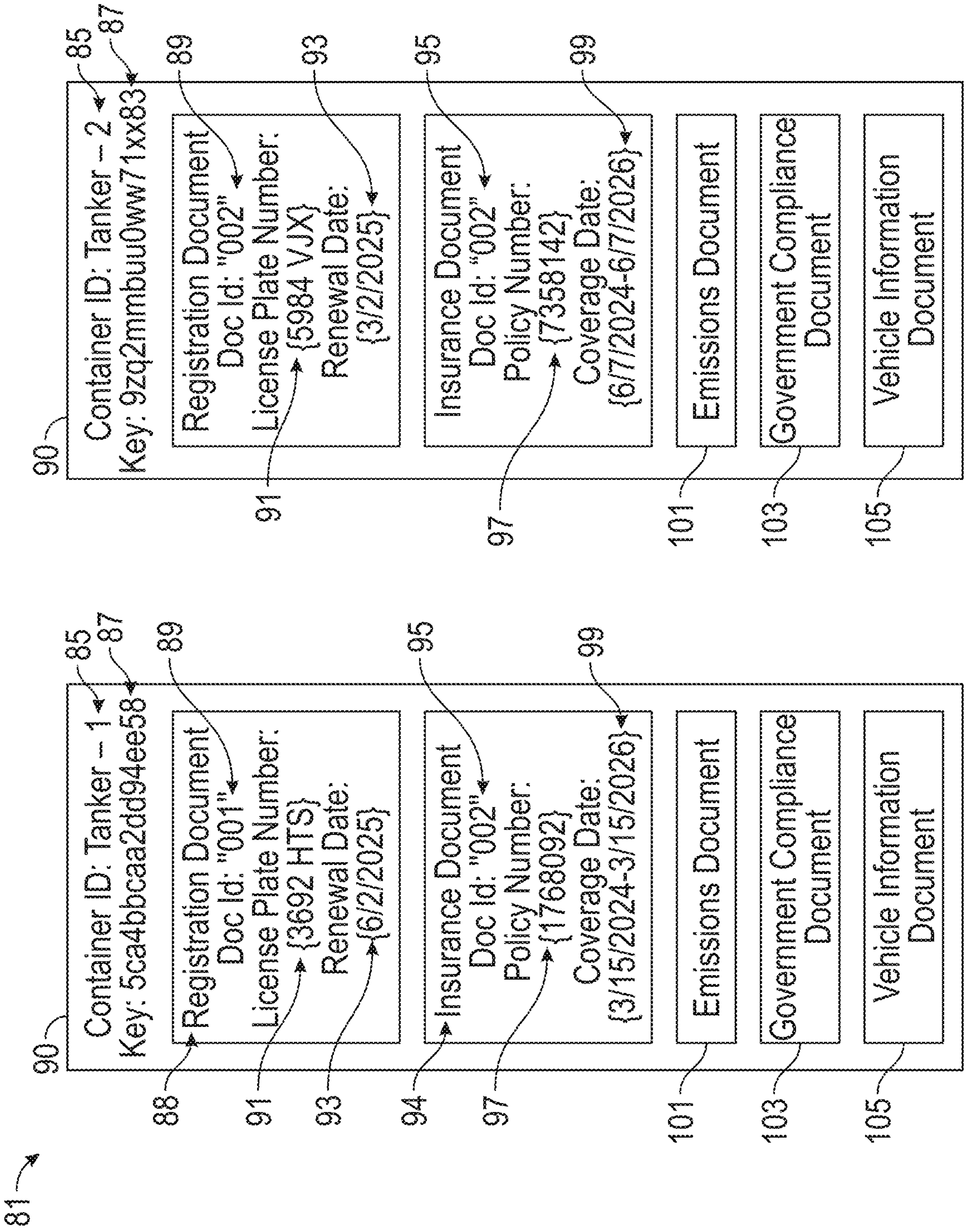
FIGS. 4A and 4B depict NoSQL databases in accordance with one or more embodiments disclosed herein.
Figure 4B:
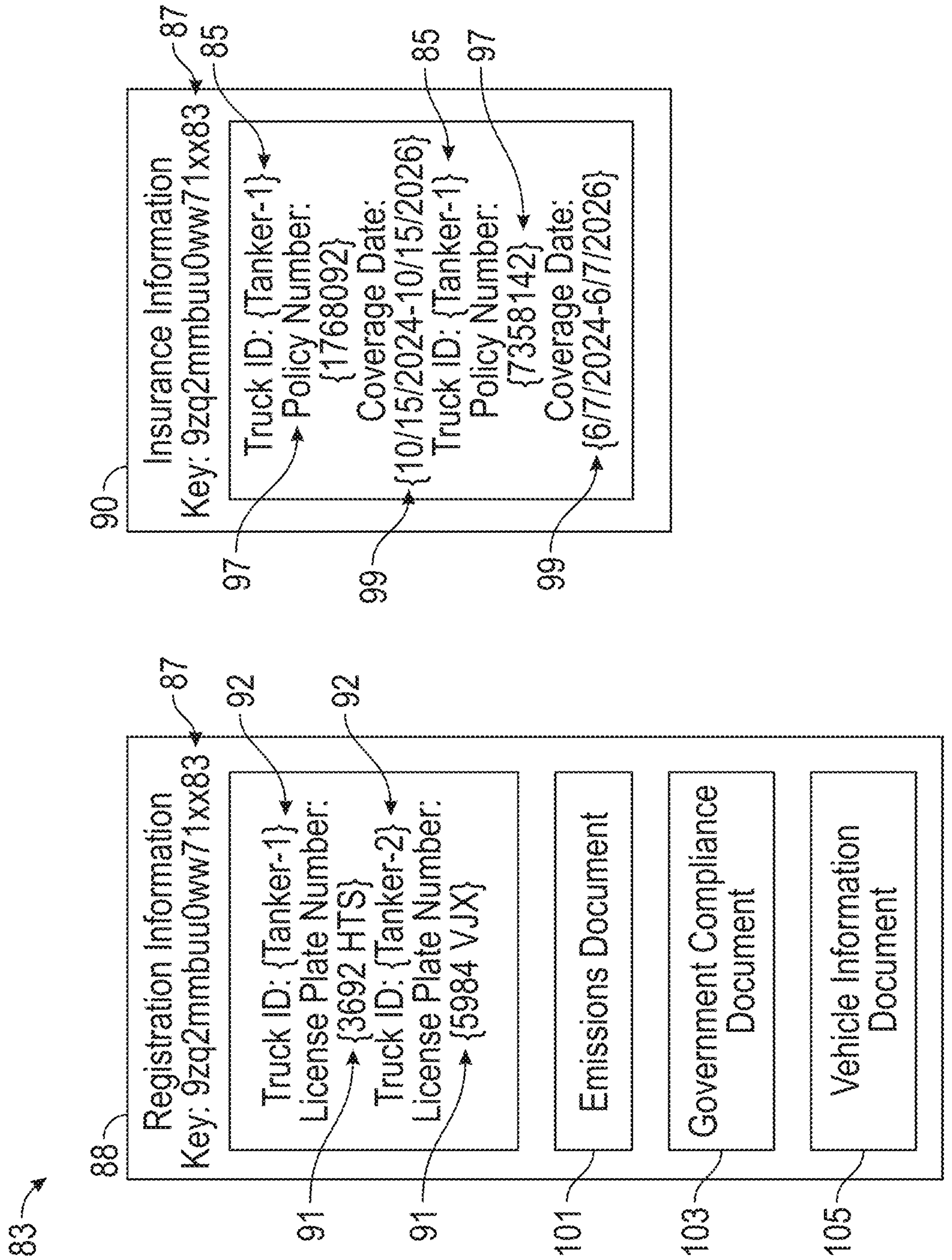

Turning to FIGS. 4A and 4B, FIGS. 4A and 4B depict examples of information stored in a NoSQL database such as the external database 45. Specifically, FIG. 4A depicts an example of a NoSQL database 81 where various documents are grouped in data containers 90 associated with separate vehicles 11. FIG. 4A is also commonly referred to as a document NoSQL database. The various documents include, for example, a registration document 88, an insurance document 94, an emissions document 101, a government compliance document 103, and a vehicle information document 105. Each document is associated with a unique document Identification (ID) number that is used to locate said document in the data containers 90. For example, the registration document 88 is associated with a document ID number 89 that has a value of "001", whereas the insurance document 94 is associated with a document ID number 95 that has a value of "002".

Similarly, each data container 90 is associated with a key that uniquely identifies said data container 90. For example, a first data container 90 associated with a first tanker (i.e., a specific vehicle 11) has a unique key value 87 of "5ca4bbcaa2dd94ee58," and a second data container 90 associated with a second tanker (i.e., another specific vehicle 11) has a unique key value 87 of "9zq2mmbuu0ww71xx83." Each data container 90 also has a container ID 85, which is a colloquial definition of the vehicle as provided by the operator for organizational and readability purposes.

The documents form data objects associated with the vehicle 11. As described herein, the term "data object" refers to a storage region or structured fields for retaining one or more values, strings, or other data related to the vehicle 11, and also generally relates to the information contained therein. For example, data objects of the NoSQL database 81 include the various documents such as the registration document 88, the insurance document 94, the emissions document 101, the government compliance document 103, and the vehicle information document 105. The registration document 88 stores data such as a license plate number 91 associated with the first tanker, as well as the renewal date 93 of the vehicle registration. One of the checks performed by the business logic layer 63 thus involves comparing the renewal date 93 with the current date to ensure that a vehicle 11 has valid registration during the inspection process. In general, the term "registration document" refers to a document issued by a governmental agency that certifies that the vehicle 11 is permitted to be driven on public roads and further states the registered owner of the vehicle.

Furthermore, the initial determination of which data container 90 is applicable for the current vehicle 11 being inspected relies upon extracting the text on the license plate of the vehicle 11 and matching the extracted text to a license plate number 91 of the external database 45 using a lookup function or search function, for example. Once the license plate number 91 of the vehicle 11 is known and the registration document 88 associated with the vehicle 11 is identified, other documents stored in the same data container 90 are retrieved by the data layer 61 and utilized by the business logic layer 63 for performing other checks.

Such other checks include, for example, verifying whether the current date falls within a coverage date window 99 provided by an insurance document 94 associated with the vehicle 11 or whether the insurance document 94 has a valid policy number 97 (i.e., verifying the policy number 97 has the correct length or format). In this regard, the insurance document 94 provides information describing an insurance policy possessed by the owner or operator of the vehicle 11 and issued by an insurance agency, which is commonly required to drive on public roadways or in industrial environments. Although not shown, the insurance document 94 may further describe policy coverage amounts, thereby allowing the operator of the computer vision model 79 to retrieve policy details for a particular vehicle 11 via the application layer 59 in the event of an accident.

Similar to the registration document 88 and the insurance document 94, the emissions document 101 certifies that the vehicle 11 has been inspected for and complies with emissions guidelines issued by a governmental authority. The business logic layer 63 may verify if an emissions document 101 is present and contains a valid emissions compliance certificate validity date (not shown) or issuance number (not shown) before allowing the vehicle access to the facility 25 as one of the aforementioned checks. The government compliance document 103 represents documentation that may be required to operate a commercial and/or heavy duty vehicle on a public roadway. Such documentation may include, for example, a U.S. Department of Transportation (DOT) number associated with the vehicle 11, if the vehicle 11 is driving in the U.S., or similar commercial registration information if operating outside of the U.S. as applicable.

The vehicle information document 105 includes information related to the mechanical operation of the vehicle, such as the Vehicle Identification Number (VIN) of the vehicle 11, the engine size, vehicle 11 load capacity, and similar information. Checks performed by the business logic layer 63 may further include determining that a government compliance document 103 is located in the data container 90 associated with the vehicle 11, and that the government compliance document 103 is complete with information matching various security thresholds (i.e., the DOT number has a correct length and structure, the DOT number renewal date has not elapsed, etc.). Similar checks to those above may be performed for the vehicle information document 105, such as verifying that the VIN contained in the vehicle information document 105 matches the identified vehicle 11 using a public VIN lookup database or based on the sequence of the VIN itself.

FIG. 4B depicts a second example of a NoSQL database 83 consistent with one or more embodiments described herein. FIG. 4B specifically depicts a second example of a document NoSQL database 83 where each document has a unique key value 87 associated therewith. In the case of FIG. 4B, each document type contains information for all vehicles, rather than each document containing information for a specific vehicle. For example, while the registration document 88 of FIG. 4A includes registration information for a specific vehicle 11 (i.e., Tanker-1), the registration document 88 of FIG. 4B includes information for all vehicles registered and potentially permitted access to the facility 25. Data fields (e.g., the license plate number 91) stored in the data objects (e.g., the registration document 88) are organized and associated with a vehicle ID 92, which is a colloquial vehicle name provided by the operator similar to the container ID 85. To retrieve data associated with a particular vehicle 11, the business logic layer 63 receives an extracted license plate number as image data 54 from the integration layer 55 and searches the registration document 88 for a matching license plate number 91. The vehicle ID 92 associated with the identified license plate number 91 is subsequently utilized by the business logic layer 63 to find other information associated with the vehicle 11 by searching through the remaining data objects of the NoSQL database 83 for matching vehicle IDs 92 and data stored in fields associated therewith.

As illustrated by the juxtaposition between FIGS. 4A and 4B, the particular structure of the NoSQL database may vary. Such variation may be a function of the number or type of data objects considered by the business logic layer 63 and/or stored on the external database 45. In addition, the type of database may further depend on the capabilities of the selected lookup function in the interest of optimal processing efficiency. In one or more alternative embodiments, the NoSQL database may be embodied as a graph type or key type NoSQL database, or organized in table form as an SQL database.

Turning to FIG. 5, FIG. 5 depicts a report table 84. The report table 84 is formed as a time-series log of requests for entry into the facility 25. The report table 84 specifically includes an internal identification number column 85, a license plate number column 96, a location column 109, a date and time column 111, a mechanical defects column 113, a valid paperwork column 115, an auxiliary defects column 117, and an access granted column 119. Each of the various columns of the report table 84 are discussed further below.

The first four columns of the report table 84 relate to vehicle inspection properties that are agnostic to the facility 25 entry determination results. Specifically, the internal identification number column 85 denotes the colloquial name (e.g., Tanker-1, Tanker-2, Tanker 3, etc.) for the vehicle 11 as provided by the operator during system configuration and retrieved from the external database 45 during vehicle 11 inspection. The license plate number column 96 provides the license plate number 91 (e.g., 3692 HTS, 5984 VJX, 7653 TJN, 1964 RGD, 3692 HTS, etc.) as extracted by the image processing layer 53. The location column denotes the particular access gate 21 (e.g., north access gate versus south access gate) and/or the general location of the facility 25 (e.g., Dhahran Bulk Plant, Abha Bulk Pant, Najran Bulk Plant, Jubail Bulk Plant, etc.), if either or both are applicable to the particular operating environment of the computer vision model 79. The date and time column 111 provides the day and time at which the vehicle 11 is detected by the image processing layer 53 and the vehicle inspection process is completed.

The remaining four columns of the report table 84 relate to the above described checks performed by the business logic layer 63. The cells of these columns include a yes (Y) or no (N) designation that indicates the results of the particular check. A yes (Y) indication relates to a determination that the conditions of the check have been met, whereas a no (N) designation indicates that the conditions of the check have not been met. In the event that a check is failed, the particular cell associated with the vehicle 11 also includes a brief text description of why the check was failed. It is noted that certain checks such as the mechanical defects and auxiliary check rely on the conditions of the check not being met to pass the check, whereas other checks such as the valid paperwork check rely on the conditions being met to pass the check. That is, a designation of yes (Y) may relate to either a pass or fail of a particular check, dependent upon which check is being performed, and similar logic applies to a no (N) designation.

The mechanical defects column 113 relates to inspections of the vehicle 11 itself based on information captured in the image data 54. For example, the mechanical defects may include that the vehicle 11 is leaking fluids (as determined by the presence of fresh fluids below the inspected vehicle 11 in an image captured by the security camera(s) 15), that the truck is excessively loud or exhibits noise indicative of mechanical failure (i.e., if a microphone (not shown) of the security camera 15 or disposed in the local environment of the access gateway 21 captures sound waves with frequencies or an amplitude above a predetermined threshold). Other mechanical checks include determining if the vehicle is dented, is missing body panels, has a cracked windshield or headlights, is missing mirrors, has a low air pressure in tires, and similar considerations that may be derived from a real-time image of the vehicle 11.

Because the computer vision model 79 is trained to recognize vehicles, the process for determining mechanical defects of the vehicle 11 may be positive recognition (i.e., the computer vision model 79 identifies and labels the defects discussed above), or negative recognition (i.e., the computer vision model 79 identifies a vehicle 11, but is unable to identify a body panel of the vehicle 11, and concludes such a body panel is absent or damaged). The above defects may be weighted relative to each other, and the final determination of whether a vehicle has mechanical defects may be derived by assigning a weighted score to the vehicle 11 being inspected and comparing the weighted score to a predefined threshold. For example, the computer vision model 79 may assign a low defect score to dented and scratched body panels, as these defects do not substantially interfere with the mechanical operation of the vehicle, and assign a high defect score to the presence of a cracked windshield since such a condition impacts the visibility of the driver of the vehicle 11. The computer vision model 79 proceeds to add the derived defect scores for each contemplated mechanical failure and, if the aggregate defect score is more than a predetermined threshold, outputs a yes (Y) determination indicating the vehicle 11 has an unacceptable number or type of mechanical defects. If the aggregate defect score is less than the predetermined threshold then the computer vision model 79 outputs a no (N) determination indicating that the vehicle 11 has an acceptable level of mechanical defects (including zero identified defects).

The valid paperwork column 115 represents checks for intrinsic information associated with the vehicle 11 and stored as data objects as discussed above. For example, a check performed by the business logic layer 63 in relation to the valid paperwork column 115 may include determining if the vehicle 11 has valid insurance coverage as discussed above. Other checks include determining if the vehicle 11 being inspected has valid government registration documentation on file (e.g., a determination that the vehicle 11 has a valid USDOT number) and determining if the vehicle 11 has proper emissions compliance documentation stored on the external database 45.

The auxiliary defects column 117 encompasses checks not performed in the mechanical defects column 113 and the valid paperwork column 115. Such checks may include, for example, a check to determine if the vehicle 11 has a number of safety equipment 18 that meets or exceeds a predetermined threshold. Other similar checks may include a check to determine if the storage equipment of the vehicle 11 (e.g., the straps) is properly functioning (e.g., the secured strap 12) or has been damaged (e.g., the severed strap 14). The auxiliary defects column 117 also encompasses operator or facility implemented checks, which may be added and customized via the application layer 59. The valid paperwork column 115 and the auxiliary defects column 117 may assign and aggregate scores to determine if a vehicle 11 passes the associated checks similar to the mechanical defects column 113, or alternatively operate on the principle that a single check not being passed forms an unmitigable failure and the vehicle 11 should be denied access. The core logic of whether any vehicle 11 should be allowed entrance to the facility 25 may thus vary according to the desired security of the access gateway 21 and the facility 25 as well as the number and type of contemplated checks.

The final column of the report table 84 represents the determination results of the computer vision model 79 and correlates to a recommendation of whether or not a particular vehicle 11 should be allowed access to the facility 25. If any of the mechanical defects column 113, the valid paperwork column 115, or the auxiliary defects column 117 indicate an overall determination that the vehicle 11 has failed that particular classification of checks, then the access granted column 119 recommends denying access via a no (N) indication. Such is indicated in the second, third, and fifth cells of the access granted column 119. The second cell indicates access should not be granted as a result of the mechanical defects column 113 indicating that the vehicle 11 has failed an associated check (i.e., due to the computer vision model 79 determining that the vehicle 11 is leaking fluids). The third cell indicates access should not be granted, and is based upon a lack of valid government registration document and a detection of a severed strap 14. The fifth cell indicates access should not be granted, and the determination is made based upon a cracked windshield of the vehicle 11 being detected by the computer vision model 79 and a lack of insurance information stored on the external database 45 for the vehicle 11.

If the mechanical defects column 113, the valid paperwork column 115, and the auxiliary defects column 117 indicate that the vehicle 11 has passed all checks applied thereto then the access granted column 119 recommends granting access via a yes (Y) indication. Such is indicated by the first and fourth cells of the access granted column 119. Thus, the access granted column 119 provides a time-series overview of instances when access to the facility 25 has been recommended or not recommended by the computer vision model 79.

As noted above, the report table 84 forms one example of a report generated by the application layer 59 and presented to the operator at the request thereof. Other reports, such as a list of instances when a particular vehicle 11 has been granted or denied access to the facility 25 may also be generated at the operator's request. In the same vein, reports concerning the number of trucks approaching the facility 25 (i.e., a Key Performance Indicator (KPI) of facility 25 usage) or the amount of goods estimated to be transported by vehicles 11 of a particular type (i.e., a simple calculation that each of the ten tankers granted access to the facility 25 in the past 24 hours carries approximately 10,000 gallons of liquid such that the facility 25 received 100,000 gallons of liquid in the previous day). In general, reports generated by the application layer 59 at the behest of the operator may generally relate to any number of KPIs related to the facility 25, and the particular type or nature of a KPIs described herein is not intended to limit the type, number, or nature of facility 25 related KPIs that may be tracked by the computer vision model 79.

Turning to FIG. 6, FIG. 6 depicts a Graphical User Interface (GUI) 121 presented to the operator via the display 41 of the computing device 25. As discussed in relation to FIG. 1, the operator may manually instruct the access gateway 21 to open based upon the recommendation appearing in the GUI 121 and as provided by the computer vision model 79. To aid in actuating the access gateway 21, the GUI 121 includes an access granted button 122 and an access denied button 124. When pressed, the access granted button 122 issues an actuation command to the access gateway 21 causing the access gateway 21 to raise and provide access to the facility 25. In juxtaposition, when the access denied button 124 is pressed the computer vision model 79 directs the access gateway 21 to actuate to a closed position, if open, or to remain in a closed position if already closed. The commands to the access gateway 21 are issued via a data connection 49 extending between the server 31 and the access gateway 21 as discussed in relation to FIG. 2.

In general, the GUI 121 is split into numerous distinct regions. The left hand side of the GUI 121 presents a vehicle information region 126 containing information retrieved from a vehicle information document 105. Specifically, the vehicle information region 126 presents the operator with the internal identification number 85, the license plate number 91, the insurance policy number 97, a VIN 123, and a government compliance number 125 associated with the vehicle 11. The requested access date and time (i.e., the current date and time or the time at which the vehicle 11 initially approached the access gateway 21, if different) are presented as date and time information 127 to the operator below the vehicle information region 126.

The central region of the GUI 121 includes a representative image 133 of the vehicle 11. The representative image 133 may be a portion of a single image captured by a security camera 15 and processed by the image processing layer 53. For example, the representative image 133 may include the portion of an image including the vehicle 11 as captured in a bounding box during the object detection process. In such cases, the representative image 133 may include a front view, an isometric view, or a side view of the vehicle 11. Alternatively, the representative image 133 may be a three dimensional model of the vehicle 11 formed via common sensor fusion, object detection, and image stitching processes employed by the image processing layer 53.

In addition, the central region of the GUI 121 includes a warning icon 129. The warning icon 129 appears in the event that it is determined that the vehicle 11 should be denied access to the facility 25. In the alternative, if it is determined that the vehicle 11 should be permitted entry, then the warning icon 129 may be replaced with an icon having a positive connotation (e.g., a green check). The warning icon 129 serves to form a convenient point to summarize the recommendation results and further allows the operator to quickly and easily determine whether the vehicle 11 should be permitted entry. Such greatly reduces the amount of time required to inspect the vehicle 11 by requiring the operator to only consider a single point of data (i.e., the existence or identity of the warning icon 129) rather than having to consider all potential checks and checklist items.

The right hand region of the GUI 121 contains information and action buttons related to permitting or denying entry of the vehicle 11 to the facility 25. The upper portion of the right hand region is a vehicle status menu 131 that presents information uncovered during the inspection process to the operator. The vehicle status menu 131 also includes an overview, in yes (Y) or no (N) designations, of whether the conditions for a particular classification of checks have been met. The particular classifications of checks correspond to the columns of the report table 84 discussed in relation to FIG. 5, and include mechanical defects checks 135, valid paperwork checks 137, and auxiliary defects checks 139.

The GUI 121 further includes buttons to operate the GUI 121. As discussed in relation to FIG. 1, the operator may manually instruct the access gateway 21 to open based upon the recommendation appearing in the GUI 121 and as provided by the computer vision model 79. To aid in actuating the access gateway 21, the GUI 121 includes an access granted button 122 and an access denied button 124. When pressed, the access granted button 122 issues an actuation command to the access gateway 21 causing the access gateway 21 to raise and provide access to the facility 25. In juxtaposition, when the access denied button 124 is pressed the computer vision model 79 directs the access gateway 21 to actuate to a closed position, if open, or to remain in a closed position if already closed. The commands to the access gateway 21 are issued via a data connection 49 extending between the server 31 and the access gateway 21 as discussed in relation to FIG. 2. In one or more alternative embodiments the GUI 121 may further highlight the button corresponding to the recommended action, or add a grey mask (not shown) to the button corresponding to the unrecommended action. A recommendation label 141 is located above the buttons 122, 124, and displays the recommendation to permit entry or deny entry to the operator in a text based format.

Overall, the GUI 121 of FIG. 6 provides an intuitive and operator-friendly visualization of the vehicle 11 inspection process employed by the computer vision model 79. The GUI 121 may be updated with a refresh rate on the order of seconds or fractions of a second to provide real-time updates of the inspection process to the operator. As noted above, it is desirable to conduct vehicle 11 inspections in a manner of seconds. The GUI 121 enables such an inspection process to be completed in such a short amount of time, as the operator is capable of verifying the status or existence of the GUI 121 and pressing the corresponding button 122, 124 without having to go through the entire inspection process manually. In one or more alternative embodiments where the computer vision model 79 actuates the access gateway 21 automatically, the buttons 122, 124 may be replaced with an icon depicting whether the access gateway 21 is open, closed, opening, or closing in order to inform the operator of the status of the access gateway 21.

Figure 7:
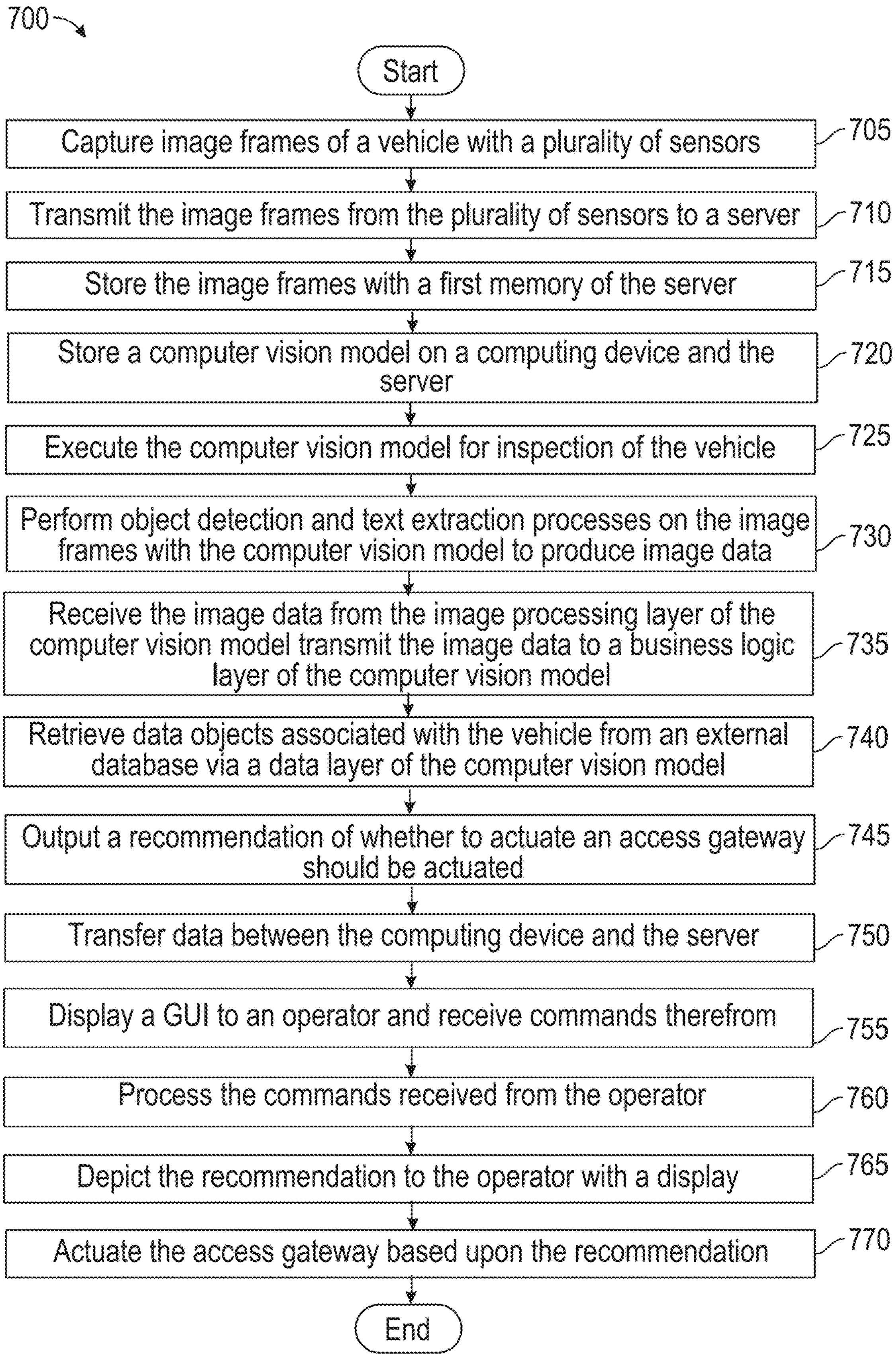
FIG. 7 depicts a flowchart of a method for inspecting a vehicle in accordance with one or more embodiments disclosed herein.

FIG. 7 depicts a method 700 for controlling the access gateway 21. Steps of FIG. 7 may be performed by a computer vision model 79 as described herein, but are not limited thereto. Furthermore, the steps of FIG. 7 may be performed in any order, such that the steps are not limited to the sequence presented. In addition, multiple steps of FIG. 7 may be performed as a single action, or one step may comprise multiple actions by devices or components described herein.

The method 700 of FIG. 7 initiates at step 705, which includes capturing image frames of a vehicle 11 with a plurality of sensors. The plurality of sensors include outdoor security cameras 15 disposed to monitor an area which includes a road 23 positioned adjacent to a vehicle inspection station 13. An access gateway 21 is positioned adjacent to the inspection station 13 such that the image frames 52 captured by the security cameras 15 include the vehicle 11 as the vehicle 11 approaches the access gateway 21. Once the image frames are captured by the security cameras 15, the method proceeds to step 710.

In step 710, the plurality of sensors transmits the image frames 52 to a server 31 with a first data connection 49. Specifically, this step includes transmitting the image frames 52 from the security cameras 15 to a network switch 29, and from the network switch 29 via a data connection 49. The data connection 49 may be embodied as a wired data connection such as ethernet. Alternatively, the security cameras 15 may be connected to the server 31 directly without a network switch 29 in instances where a small number (e.g., one) of security camera(s) 15 are used for inspection. Once the image frames 52 are transmitted to the server 31, the method proceeds to step 715.

In step 715, a first memory 33 of the server 31 stores the image frames 52. The memory 33 of the server 31 includes a non-transient storage medium such as an HDD or SSD. The image frames 52 are stored on the memory 33 of the server 31 in order to be processed by the image processing layer 53, which forms a portion of the server side 75 of the computer vision model 79. Once the image frames 52 are stored in the first memory 33 of the server 31, the method proceeds to step 720.

Step 720 includes storing a computer vision model 79 on a memory 33 of a computing device 39 and a memory 33 of the server 31. The memory 33 of the computing device 39 stores the client side portion 77 of the computer vision model 79 and the memory 33 of the server 31 stores the server side portion 75 of the computer vision model 79. The computer vision model 79 is thus stored in a distributed fashion across the server 31 and the computing device 39.

Step 725 includes executing the computer vision model 79 for inspection of the vehicle 11. As discussed above and similar to step 720, the computer vision model 79 is executed using the CPU 35 and the GPU 37 of the server 31 and the CPU 35 of the computing device 39. The CPU 35 and the GPU 37 of the computer vision model 79 execute the server side portion 75 of the computer vision model 79. The CPU 35 of the computing device 39 executes the client side portion 77 of the computer vision model 79. Specific steps of executing the computer vision model 79 are presented in steps 730-770, below.

In Step 730, an image processing layer 53 of the computer vision model 79 performs object detection processes and text extraction processes on the image frames 52, thereby producing image data 54. Such object detection processes may include determining the location and identity of a vehicle 11 present in the image frames 52 using a CNN such as ResNet. The image data 54 generated by the imaging processing layer 53 includes a license plate number 91 of the vehicle 11, which is subsequently used to retrieve data objects (e.g., documents) associated with the vehicle 11. In addition, the image data 54 also includes information regarding a number of safety equipment (e.g., the straps 12, 14 and the fire extinguisher 16) present on the vehicle 11, as well as identities thereof.

In step 740 a data layer 61 of the computer vision model 79 retrieves data objects from an external database 45. The data objects include documents (e.g., the registration document 88, the insurance document 94, etc.) associated with the vehicle 11. Each data object includes one or more fields storing information relating to intrinsic vehicle 11 information. The data objects generally relate to compliance of the vehicle 11 with various agencies (e.g., an emissions document 101 details compliance with an emissions regulatory agency) or provide other forms of intrinsic vehicle 11 information such as a VIN 123 of the vehicle 11. The data objects are retrieved from an external database 45 via the data layer 61 as discussed above.

Step 745 includes determining and outputting a recommendation of whether a vehicle 11 should be permitted entry to the facility 25. In the context of this disclosure, the phrase "permitted entry" encompasses the actuation of the access gateway 21 to allow the vehicle 11 to drive into the facility 25 via the road 23. An overview of the determination process is discussed in relation to FIG. 5. Briefly, the determination process involves performing "checks" on the vehicle 11, which are inspections of intrinsic and extrinsic vehicle 11 information and comparisons of the information to predetermined thresholds. The checks are performed by the business logic layer 63 of the computer vision model 79. If the vehicle 11 fails a predetermined number of checks or a particular check or series of checks, denial of entry is recommended by the computer vision model 79. In the alternative, if the vehicle 11 passes all checks or a certain number of checks then permission of entry into the facility 25 is recommended.

Step 750 includes transferring data between the computing device 39 and the server 31 using a data connection 49. The data transferred between the computing device 39 and the server 31 may include the aforementioned recommendation derived in step 745. The transferred data may further include a request from the operator for a report to be generated as discussed above and as further discussed below, in which case the client layer 67 bidirectionally communicates with the application layer 59 to fulfill the operator's request.

Step 755 includes presenting a GUI 121 to the operator using a display 41 of the computing device 39. The GUI 121 is generated by the client layer 67 of the computer vision model 79. The GUI 121 allows the operator to interface with the computer vision model 79 in various manners as discussed below in relation to steps 760 and 765. To receive input from the operator, the computing device 39 further includes an HMI 43 comprising a touchscreen, a keyboard and mouse, or similar computing peripherals.

In step 760, commands received from the operator are fulfilled via the application layer 59. As discussed above, the client layer 67 and the application layer 59 bidirectionally communicate to allow operator requests to be captured with the computing device 39 and fulfilled with the server 31 and connected components. By way of nonlimiting examples, the commands fulfilled by the application layer 59 at the request of the operator include report generation requests, requests to view a specific video feed, and requests to retrieve stored video data.

Step 765 includes depicting the recommendation to the operator via a display 41. The display 41 is hardware of the computing device 39, and may be practically embodied as a monitor or other display panel. The GUI 121 is rendered by the client layer 67. The recommendation is presented in the form of a recommendation label 141 on the lower right hand portion of the GUI 121. The recommendation may also be viewed in the form of a cell of a report table 84 generated by the application layer 59 detailing time-series facility 25 access requests. Once the recommendation is provided to the operator, the method proceeds to step 770.

In step 770, the access gateway 21 is actuated based upon the recommendation. Step 770 may be performed manually by the operator actuating a switch (not shown) connected to the access gateway 21. Alternatively, the access gateway 21 may be actuated semi-automatically by the operator interacting with the buttons 122, 124 presented in the GUI 121 and the computer vision model 79 actuating the access gateway 21 accordingly. As another alternative example, the computer vision model 79 may actuate the access gateway 21 directly without operator input, which may be beneficial when an access gateway 21 is not frequently approached and it is undesirable to staff the inspection station 13 with personnel. The actuation of the access gateway 21 corresponds to whether the entry of the vehicle 11 into the facility 25 is recommended to be permitted or denied. Specifically, if the computer vision model 79 recommends denying entry, the command issued by the computer vision model 79 to the access gateway 21 is a command to remain closed or actuate to a closed position. Similarly, if the computer vision model 79 recommends permitting entry then the command issued by the computer vision model 79 to the access gateway 21 is a command to actuate to an open position or remain open.

Thus, the method 700 concludes with the vehicle 11 being inspected by the computer vision model 79 and the access gateway 21 being actuated (or not actuated) according to the determination result. As discussed above, the automation of the inspection process of the vehicle 11 greatly reduces the mental and physical burden placed on the operator to conduct the inspection. As a further benefit of this arrangement, a computer vision model 79 as described herein offers benefits of being capable of automatically retrieving intrinsic information associated with the vehicle 11 without the need for operator input, reducing the amount of time necessary to complete an inspection.

Although only a few example embodiments have been described in detail above, those skilled in the art will readily appreciate that many modifications are possible in the example embodiments without materially departing from this invention. For example, the system may be restricted to inspecting a truck (i.e., a freight truck, a heavy-duty truck, an off-road truck, etc.) at the plant in the oil and gas industry. Alternative embodiments may include the access gateway comprising a wedge barrier that sits in a flush position with the surface of the road and rises to a locked position forming a wedge shape to block oncoming traffic. In addition, many modifications will be appreciated by those skilled in the art to adapt a particular component, situation, or material to embodiments of the disclosure without departing from the essential scope thereof. Accordingly, all such modifications are intended to be included within the scope of this disclosure as defined in the following claims.

Furthermore, the composition described herein may be free of any component, or composition not expressly recited or disclosed herein. Any method may lack any step not recited or disclosed herein. Likewise, the term "comprising" is considered synonymous with the term "including." Whenever a method, composition, element, or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by one or more embodiments described herein. At the very least, and not as an attempt to limit the application of the doctrine of equivalents to the scope of the claim, each numerical parameter should at least be construed in light of the number of reported significant digits and by applying ordinary rounding techniques.

What is claimed is:

1. A system comprising:

an access gateway configured to actuate in order to selectively permit and deny entry of a vehicle into a facility;

a plurality of sensors configured to capture image frames of the vehicle;

a server comprising:

a first processor configured to execute a first set of computer readable instructions forming a first portion of a computer vision model, and a first memory configured to store the image frames, and further configured to store the first set of computer readable instructions;

a computing device comprising:

a second processor configured to execute a second set of computer readable instructions forming a second portion of the computer vision model, and a second memory configured to store the second set of computer readable instructions;

a display configured to depict a recommendation of whether the access gateway should be actuated to an operator of the access gateway, wherein the computer vision model comprises:

a client layer configured to display a Graphical User Interface (GUI) to the operator and receive commands therefrom;

an image processing layer configured to perform object detection processes and text extraction processes on the image frames, thereby producing image data;

a data layer configured to retrieve data objects associated with the vehicle from an external database based on the image data;

a business logic layer configured to:

determine, based on the image data, a condition for each of a plurality of mechanical defect checks comprising a leaking fluids check, a noise check, a cracked windshield check, a missing body panel check, and a tire pressure check, wherein each mechanical defect check comprises a weight;

determine, based on the retrieved data objects, a condition for each of a plurality of data object checks comprising a registration check, an insurance check, and an emissions check, wherein each data object check comprises a weight;

determine, based on the image data, a condition for each of a plurality of auxiliary checks comprising a safety equipment check and a storage check, wherein each auxiliary check comprises a weight;

determine a mechanical defect score based on the condition and weight of each mechanical defect check of the plurality of mechanical defect checks;

determine a data object score based on the condition and weight of each data object check of the plurality of data object checks;

determine an auxiliary score based on the condition and weight of each auxiliary check of the plurality of auxiliary checks;

determine a mechanical defect threshold, a data object threshold, and an auxiliary threshold based on a security level of the access gateway; and determine and output, to the display, the recommendation of whether to permit or deny entry of the vehicle to the facility using the access gateway based on a comparison of the mechanical defect score to the mechanical defect threshold, a comparison of the data object score to the data object threshold, and a comparison of the auxiliary score to the auxiliary threshold, wherein the access gateway controlled based on the recommendation.

2. The system of claim 1, wherein the data objects associated with the vehicle comprise at least one of: registration information of the vehicle, insurance information of the vehicle, and emissions information of the vehicle.

3. The system of claim 1, wherein the plurality of sensors comprise outdoor security cameras disposed to monitor an area comprising a road positioned adjacent to a vehicle inspection station.

4. The system of claim 1, wherein the commands received from the operator comprise a request to generate a time-series data log of previous instances where entry to the facility has been granted or denied by the computer vision model.

5. The system of claim 1, wherein the image data generated by the image processing layer comprises a license plate number of the vehicle, mechanical defects associated with the vehicle, a number of goods or volume of goods transported by the vehicle, and a number of safety equipment present on the vehicle.

6. The system of claim 5, wherein the safety equipment check determines whether the number of safety equipment present on the vehicle is greater than or equal to a required number of safety equipment, and wherein the business logic layer is configured to determine that the vehicle should be denied entry to the facility in response to the condition of the safety equipment check being fail.

7. The system of claim 1, wherein the business logic layer is configured to determine that the vehicle should be denied entry to the facility based upon a determination that the data objects associated with the vehicle do not include any of a registration information for the vehicle, a government compliance information for the vehicle, or an emissions compliance information for the vehicle.

8. The system of claim 1, wherein the access gateway comprises a gateway arm.

9. The system of claim 1, wherein the computer vision model is further configured to automatically issue a control command to the access gateway based upon the determination output by the business logic layer.

10. The system of claim 1, wherein the display is further configured to depict a first icon and a second icon to the operator, where the first icon corresponds to issuing an actuation command to the access gateway and the second icon corresponds to issuing a non-actuation command to retain the access gateway in a closed position, and the computer vision model is further configured to issue a control command to the access gateway corresponding to whether the first icon or the second icon is selected by the operator.

11. A method comprising:

capturing image frames of a vehicle with a plurality of sensors disposed proximate an access gateway configured to actuate to selectively permit and deny entry of the vehicle into a facility;

transmitting the image frames from the plurality of sensors to a server, wherein:

a memory of the server stores the image frames and further stores a first set of computer readable instructions forming a first portion of a computer vision model, the server is communicatively coupled to a computing device that stores, using a memory of the computing device, a second set of computer readable instructions forming a second portion of the computer vison model;

executing the first portion of the computer vision model with a processor of the server and executing the second portion of the computer vision model with a processor of the computing device, where executing the first portion and the second portion of the computer vision model comprises:

performing object detection processes and text extraction processes on the image frames, thereby producing image data;

retrieving data objects associated with the vehicle from an external database based on the image data;

determining, based on the image data, a condition for each of a plurality of mechanical defect checks comprising a leaking fluids check, a noise check, a cracked windshield check, a missing body panel check, and a tire pressure check, wherein each mechanical defect check comprises a weight;

determining, based on the retrieved data objects, a condition for each of a plurality of data object checks comprising a registration check, an insurance check, and an emissions check, wherein each data object check comprises a weight;

determining, based on the image data, a condition for each of a plurality of auxiliary checks comprising a safety equipment check and a storage check, wherein each auxiliary check comprises a weight;

determining a mechanical defect score based on the condition and weight of each mechanical defect check of the plurality of mechanical defect checks;

determining a data object score based on the condition and weight of each data object check of the plurality of data object checks;

determining an auxiliary score based on the condition and weight of each auxiliary check of the plurality of auxiliary checks;

determining a mechanical defect threshold, a data object threshold, and an auxiliary threshold based on a security level of the access gateway; and determining a recommendation of whether to permit or deny entry of the vehicle to the facility using the access gateway based on a comparison of the mechanical defect score to the mechanical defect threshold, a comparison of the data object score to the data object threshold, and a comparison of the auxiliary score to the auxiliary threshold; and depicting the recommendation to an operator with a display;

wherein the access gateway is controlled based on the recommendation.

12. The method of claim 11, wherein the data objects associated with the vehicle comprise at least one of: registration information of the vehicle, insurance information of the vehicle, and emissions information of the vehicle.

13. The method of claim 11, wherein the plurality of sensors comprise outdoor security cameras, and the method further comprises disposing the outdoor security cameras to monitor an area comprising a road positioned adjacent to a vehicle inspection station.

14. The method of claim 11, wherein executing the first portion and the second portion of the computer vision model further comprises receiving a command from an operator to generate a time-series data log of previous instances where entry to the facility is granted or denied by the computer vision model.

15. The method of claim 11, wherein the image data comprises a license plate number of the vehicle, mechanical defects associated with the vehicle, a number of goods or volume of goods transported by the vehicle, and a number of safety equipment present on the vehicle.

16. The method of claim 15, wherein the safety equipment check determines whether the number of safety equipment present on the vehicle is greater than or equal to a required number of safety equipment, and wherein executing the first portion and the second portion of the computer vision model further comprises: determining to deny, using the access gateway, entry of the vehicle should be denied entry to the facility in response to the condition of the safety equipment check being fail.

17. The method of claim 11, wherein executing the first portion and the second portion of the computer vision model further comprises determining to deny, using the access gateway, entry of the vehicle to the facility in response to a determination that the data objects associated with the vehicle do not include any of a registration information for the vehicle, a government compliance information for the vehicle, or an emissions compliance information for the vehicle.

18. The method of claim 11, wherein the access gateway comprises a gateway arm.

19. The method of claim 11, wherein control of the access gateway based on the recommendation is performed automatically.

20. The method of claim 11, further comprising:

depicting, on the display, a first icon and a second icon to the operator, where the first icon corresponds to issuing an actuation command to the access gateway and the second icon corresponds to issuing a non-actuation command, and issuing a control command to control the access gateway corresponding to whether the first icon or the second icon is selected by the operator.

* * * * *